(12) United States Patent
Noguchi

(10) Patent No.: US 9,864,869 B2
(45) Date of Patent: Jan. 9, 2018

(54) INFORMATION PROCESSING APPARATUS CONFIGURED TO CONTROL ACCESS TO CONTENT, CONTROL METHOD THEREFOR AND SYSTEM

(71) Applicant: CANON KABUSHIKI KAISHA, Tokyo (JP)

(72) Inventor: Toshiyuki Noguchi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 384 days.

(21) Appl. No.: 14/529,729

(22) Filed: Oct. 31, 2014

(65) Prior Publication Data
US 2015/0128294 A1 May 7, 2015

(30) Foreign Application Priority Data

Nov. 6, 2013 (JP) ................................. 2013-230524
Oct. 20, 2014 (JP) ................................. 2014-213984

(51) Int. Cl.
*G06F 21/62* (2013.01)
*H04L 29/06* (2006.01)
*H04L 29/08* (2006.01)

(52) U.S. Cl.
CPC .......... *G06F 21/62* (2013.01); *G06F 21/6218* (2013.01); *G06F 21/6236* (2013.01); *G06F 21/6245* (2013.01); *H04L 63/10* (2013.01); *H04L 67/02* (2013.01)

(58) Field of Classification Search
CPC ......... H04L 63/10; H04L 67/02; G06F 21/62; G06F 21/6218; G06F 21/6236; G06F 21/6245
See application file for complete search history.

(56) References Cited

U.S. PATENT DOCUMENTS

| | | | | |
|---|---|---|---|---|
| 8,640,257 | B1* | 1/2014 | Sherrets | G06F 21/6245 707/732 |
| 2011/0004922 | A1* | 1/2011 | Bono | G06F 21/6263 726/4 |
| 2011/0178881 | A1 | 7/2011 | Pulletikurty | |
| 2011/0321137 | A1* | 12/2011 | Iida | G06F 21/6245 726/4 |
| 2012/0059884 | A1 | 3/2012 | Rothschild | |

(Continued)

FOREIGN PATENT DOCUMENTS

WO 2011/007554 A1 1/2011
WO 2013/160539 A 10/2013

OTHER PUBLICATIONS

European Search Report dated Mar. 5, 2015, that issued in the corresponding European Patent Application No. 14003665.8.

*Primary Examiner* — Theodore C Parsons
(74) *Attorney, Agent, or Firm* — Cowan, Liebowitz & Latman, P.C.

(57) ABSTRACT

A system in which a communication apparatus and first and second information processing apparatuses are communicably connected, comprises a comparison unit which compares a first disclosure range set in the first information processing apparatus with a second disclosure range set in the second information processing apparatus, and a notification unit which sends a notification to the communication apparatus. The information processing apparatuses distributes the content to a third-party terminal included in a disclosure range decided based on the result of the comparison.

17 Claims, 14 Drawing Sheets

(56) References Cited

U.S. PATENT DOCUMENTS

| | | |
|---|---|---|
| 2013/0031173 A1 | 1/2013 | Deng |
| 2014/0344948 A1* | 11/2014 | Hayato .............. G06F 21/6218 |
| | | 726/26 |
| 2015/0113661 A1* | 4/2015 | Mishra ............... G06F 21/6245 |
| | | 726/26 |
| 2015/0113664 A1* | 4/2015 | Aad .................. G06K 9/00288 |
| | | 726/27 |

* cited by examiner

| DISCLOSURE RANGE SETTING |
|---|
| PLEASE SET DISCLOSURE RANGE<br>WHEN DISTRIBUTED FROM EXTERNAL SERVICE<br>○ EVERYONE ~ 402<br>○ ACQUAINTANCES ~ 403        405    406<br>○ JUST ME ~ 404                          [ SET ]  [ CANCEL ] |

| DISCLOSURE RANGE SETTING |
|---|
| PLEASE SET ITEM TO BE DISPLAYED<br>WHEN UPLOADING FROM APPARATUS<br>☐ UNLIMITED ~ 408<br>☐ FRIENDS ONLY ~ 409        411    412<br>☐ NOBODY ~ 410                         [ SET ]  [ CANCEL ] |

PLEASE DESIGNATE DISCLOSURE RANGE

| |
|---|
| UNLIMITED |
| FRIENDS ONLY |
| NOBODY |

| DISCLOSURE RANGE CONFIRMATION |
|---|
| DISCLOSURE RANGE WIDER THAN THAT OF EXTERNAL SERVICE<br>CANNOT BE SET<br>PLEASE CONFIRM DISCLOSURE SETTING OF EXTERNAL SERVICE HERE<br>417           416              418<br>☐ DO NOT DISPLAY CONFIRMATION SCREEN NEXT TIME   [ OK ] |

FIG. 5

| | | DISTRIBUTION SOURCE | | |
|---|---|---|---|---|
| | | NOBODY | FRIENDS ONLY | UNLIMITED |
| DISTRIBUTION DESTINATION | JUST ME | JUST ME | JUST ME | JUST ME |
| | ACQUAINTANCES | JUST ME | ACQUAINTANCES | ACQUAINTANCES |
| | EVERYONE | JUST ME | ACQUAINTANCES | EVERYONE |

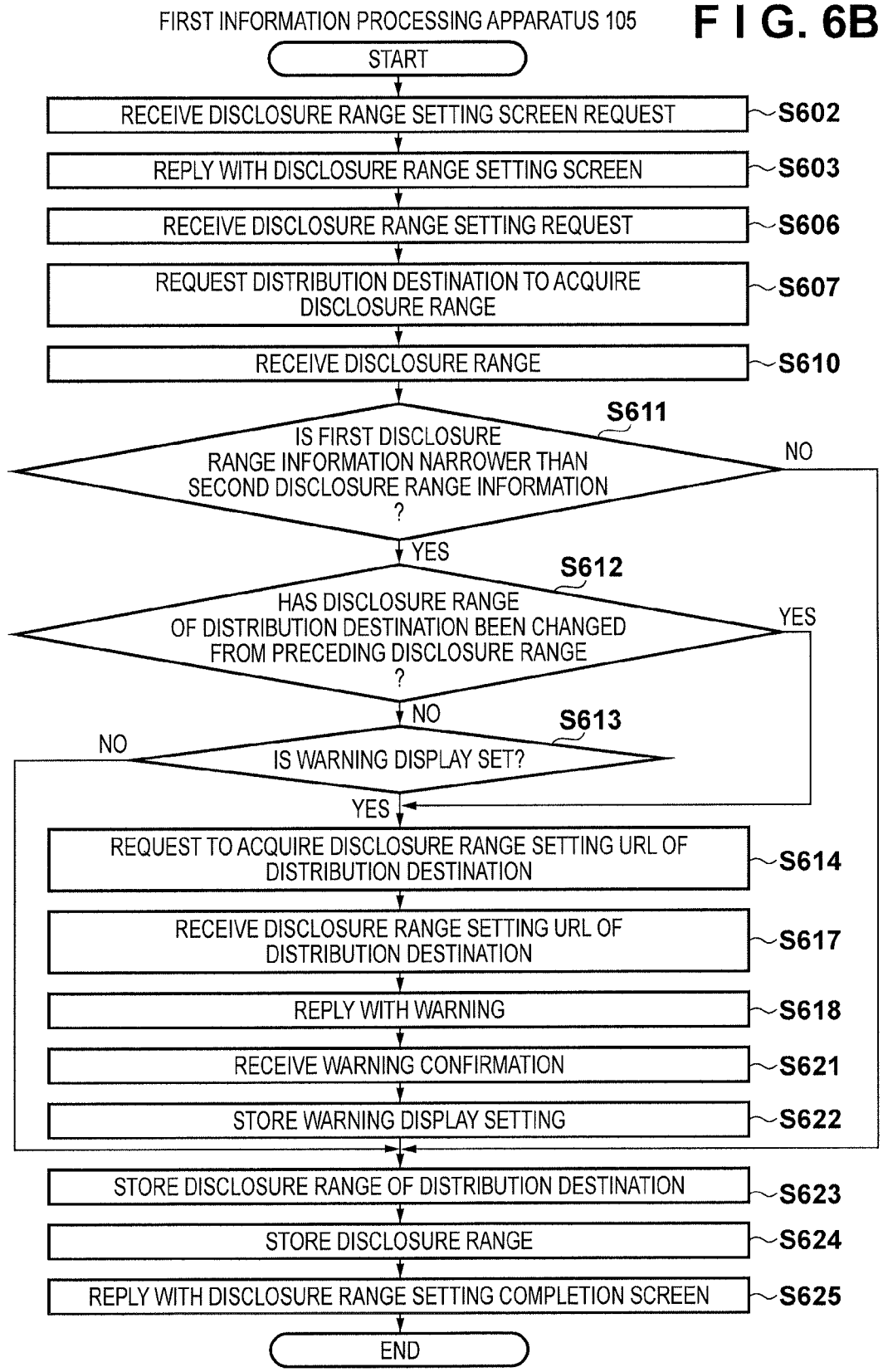

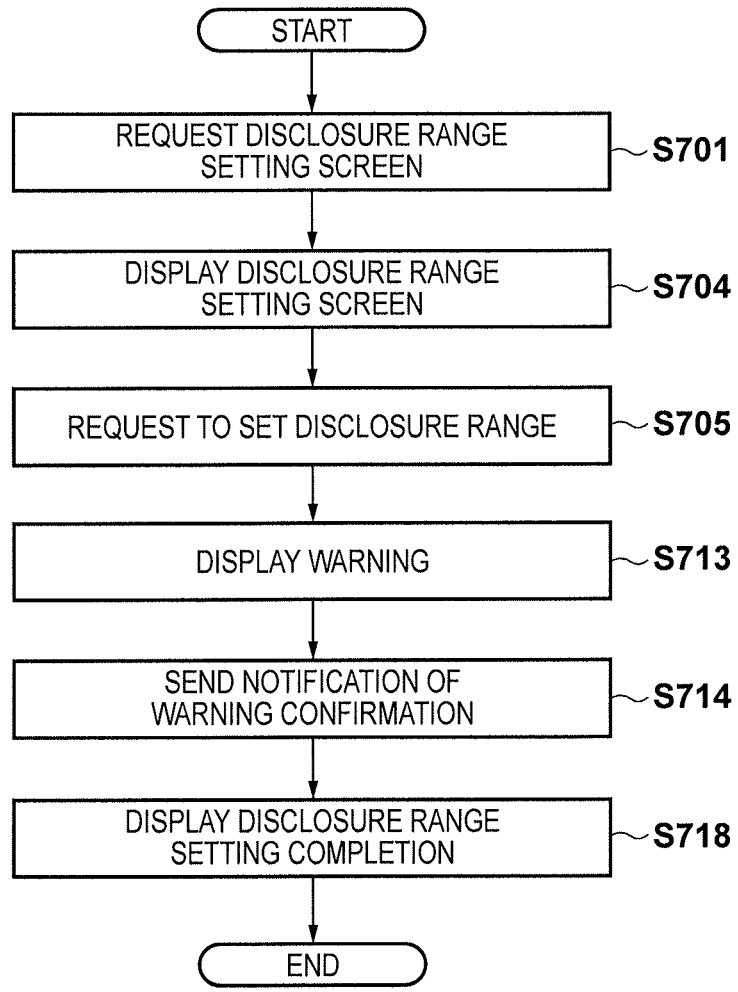

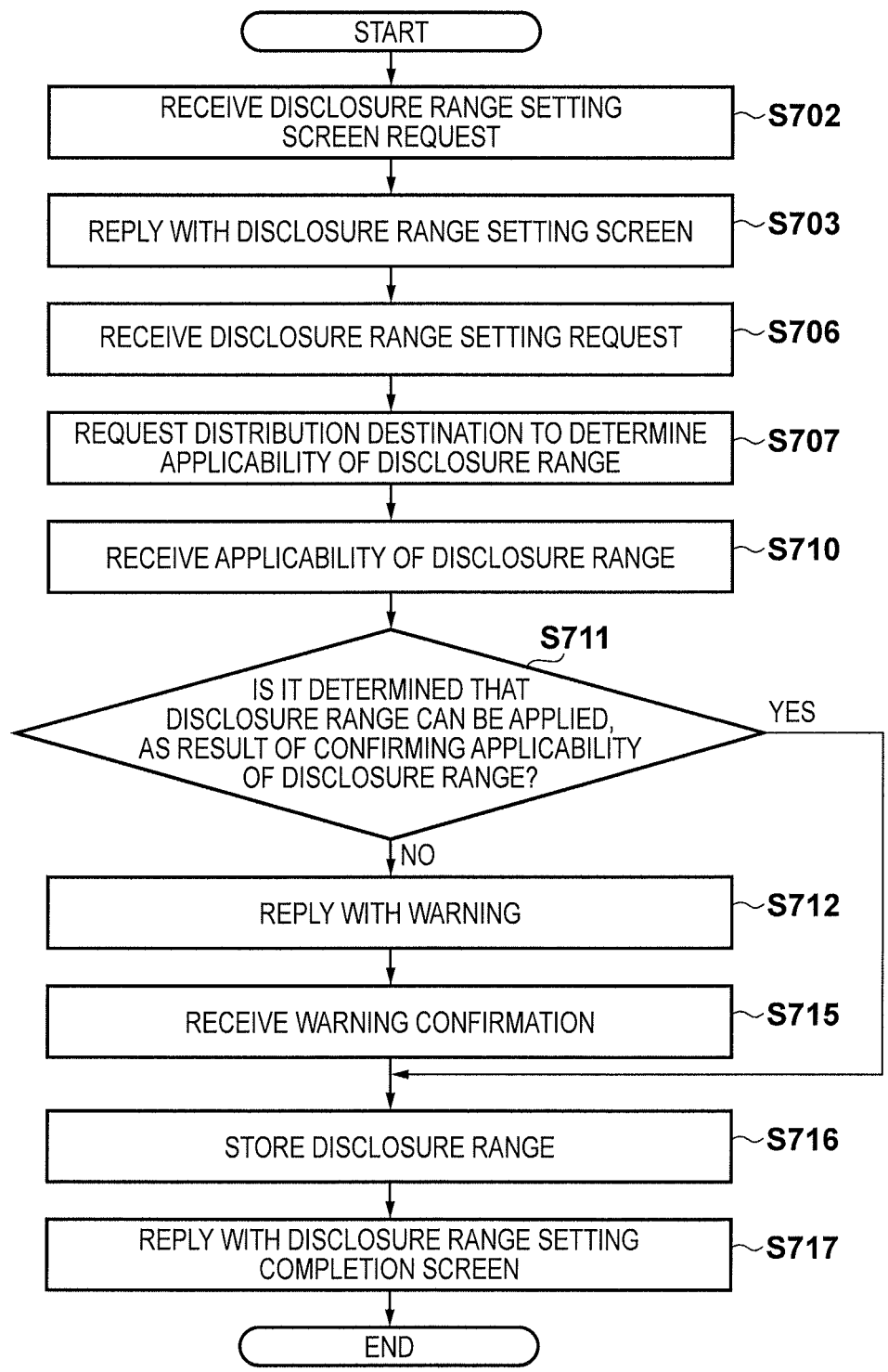

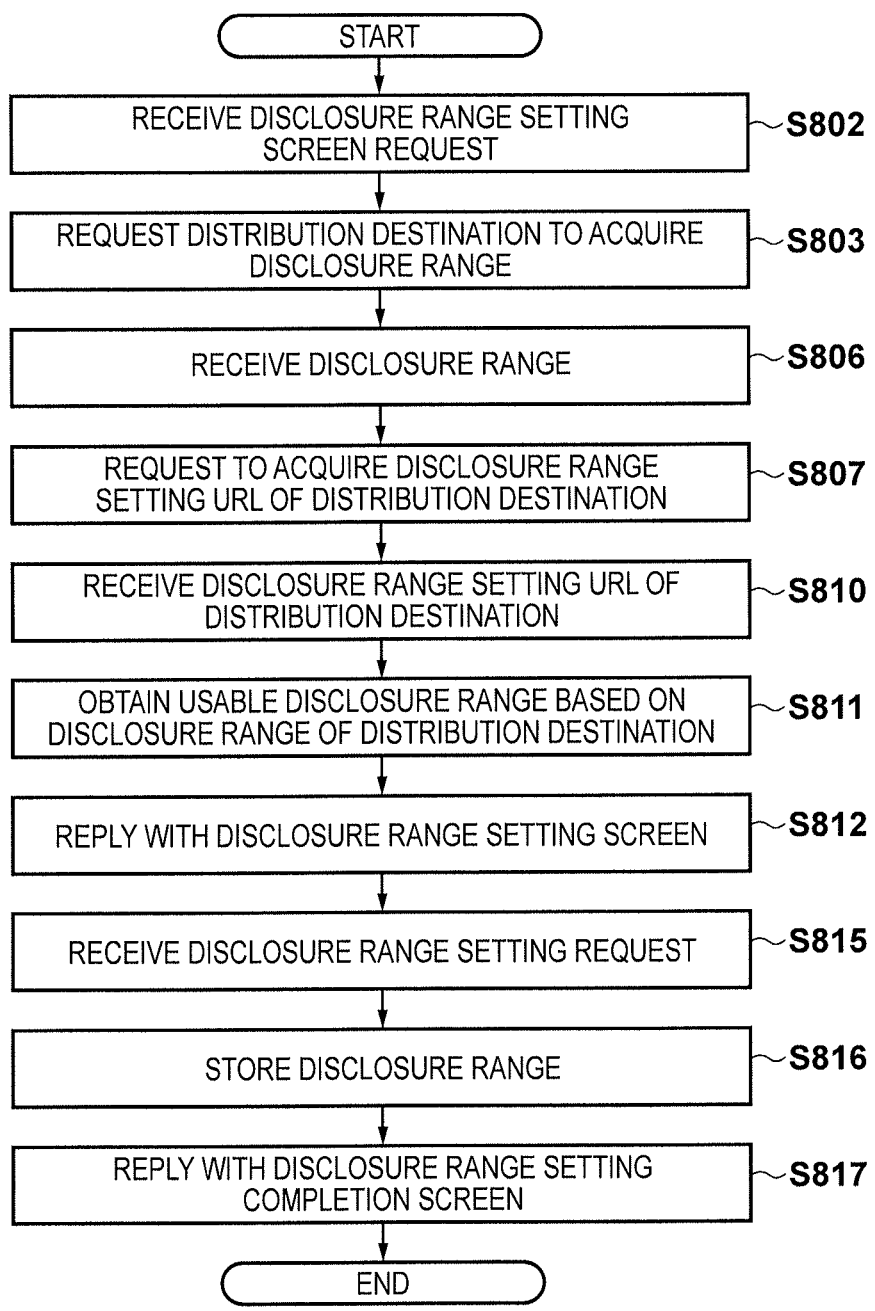

INFORMATION PROCESSING APPARATUS CONFIGURED TO CONTROL ACCESS TO CONTENT, CONTROL METHOD THEREFOR AND SYSTEM

BACKGROUND OF THE INVENTION

Field of the Invention

The present invention relates to a technique of setting the disclosure range of a content in a plurality of sites.

Description of the Related Art

Conventionally, when a user terminal uploads a content to a server apparatus, and the server apparatus distributes the content to a third-party terminal, the user sets in advance the distribution target (disclosure range) of the content in the server apparatus, and the server apparatus distributes the content to only a third-party terminal included in the disclosure range (see WO2011/007554).

Furthermore, the first server apparatus to which a content has been uploaded from the user terminal serves as a relay apparatus to transfer the content to the second server apparatus, and the second server apparatus distributes the content to a third-party terminal.

In this case, there is no problem only if the disclosure range of a content set in the first server apparatus is the same as that set in the second server apparatus. If, however, the set disclosure ranges are different from each other, the second server apparatus may unwantedly distribute the content to a third-party terminal within a disclosure range different from that intended when the user uploads the content from the user terminal to the first server apparatus.

SUMMARY OF THE INVENTION

The present invention has been made in consideration of the aforementioned problems, and realizes a technique of allowing the user who uploads a content to the first server apparatus to correctly know a range within which the content is actually disclosed, when the first server apparatus serving as a relay apparatus can set the disclosure range of a content and the second server apparatus for distributing a content to a third-party terminal can also independently set the disclosure range of a content.

In order to solve the aforementioned problems, the present invention provides a system in which at least one communication apparatus and a plurality of information processing apparatuses are communicably connected, each of the plurality of information processing apparatuses including a storage which control to store a content in a storage medium, a setting which set a disclosure range of the content, a communication which transmit/receive the content from a first information processing apparatus to a second information processing apparatus, and a distribution which distribute the content from the second information processing apparatus to a third-party terminal, the system comprising: a comparison which compare a first disclosure range set in the first information processing apparatus with a second disclosure range set in the second information processing apparatus; and a notification which send a notification to the communication apparatus based on a result of the comparison, wherein the distribution unit distributes the content to a third-party terminal included in a disclosure range decided based on the result of the comparison.

In order to solve the aforementioned problems, the present invention provides a control method for an information processing apparatus communicable with a communication apparatus and an external apparatus via a network, comprising: receiving a content from the communication apparatus; transferring the content to the external apparatus; acquiring first disclosure range information indicating a disclosure range of the content from the communication apparatus; acquiring second disclosure range information indicating a disclosure range of a content set in the external apparatus from the external apparatus; comparing the disclosure range of the first disclosure range information with the disclosure range of the second disclosure range information; and selectively executing notification to the communication apparatus based on a result of the comparison.

In order to solve the aforementioned problems, the present invention provides a control method for an information processing apparatus communicable with a communication apparatus and an external apparatus via a network, comprising: receiving a content from the communication apparatus; transferring the content to the external apparatus; acquiring first disclosure range information indicating a disclosure range of the content from the communication apparatus; transmitting the first disclosure range information to the external apparatus; receiving a result of comparing the disclosure range of the first disclosure range information with a disclosure range of second disclosure range information indicating a disclosure range of a content set in the external apparatus; and selectively executing notification to the communication apparatus based on the result of the comparison.

In order to solve the aforementioned problems, the present invention provides a control method for an information processing apparatus communicable with a communication apparatus and an external apparatus via a network, comprising: receiving a content from the communication apparatus; transferring the content to the external apparatus; acquiring second disclosure range information indicating a disclosure range of a content set in the external apparatus from the external apparatus; transmitting a setting screen, based on the second disclosure range information, for setting a disclosure range in a first information processing apparatus to the communication apparatus; storing first disclosure range information indicating a disclosure range input according to the setting screen; and transferring the first disclosure range information to the external apparatus as information indicating a disclosure range of the content.

In order to solve the aforementioned problems, the present invention provides an information processing apparatus communicable with a communication apparatus and an external apparatus via a network, comprising: a memory; and a processor configured to execute, in accordance with program codes stored in the memory, receiving a content from the communication apparatus, transferring the content to the external apparatus, acquiring first disclosure range information indicating a disclosure range of the content from the communication apparatus, acquiring second disclosure range information indicating a disclosure range of a content set in the external apparatus from the external apparatus, comparing the disclosure range of the first disclosure range information with the disclosure range of the second disclosure range information, and selectively executing notification to the communication apparatus based on a result of the comparison.

In order to solve the aforementioned problems, the present invention provides an information processing apparatus communicable with a communication apparatus and an external apparatus via a network, comprising: a memory; and a processor configured to execute, in accordance with program codes stored in the memory, receiving a content from the communication apparatus, transferring the content to the external apparatus, acquiring first disclosure range information indicating a disclosure range of the content from the communication apparatus, transmitting the first disclosure range information to the external apparatus, receiving a result of comparing the disclosure range of the first disclosure range information with a disclosure range of second disclosure range information indicating a disclosure range of a content set in the external apparatus, and selectively executing notification to the communication apparatus based on the result of the comparison.

In order to solve the aforementioned problems, the present invention provides an information processing apparatus communicable with a communication apparatus and an external apparatus via a network, comprising: a memory; and a processor configured to execute, in accordance with program codes stored in the memory, receiving a content from the communication apparatus, transferring the content to the external apparatus, acquiring second disclosure range information indicating a disclosure range of a content set in the external apparatus from the external apparatus, transmitting a setting screen, based on the second disclosure range information, for setting a disclosure range in a first information processing apparatus to the communication apparatus, storing first disclosure range information indicating a disclosure range input according to the setting screen, and transferring the first disclosure range information to the external apparatus as information indicating a disclosure range of the content.

According to the present invention, the user can readily recognize that the disclosure range of a content set in a content distribution source is different from that set in a content distribution destination.

Further features of the present invention will become apparent from the following description of exemplary embodiments (with reference to the attached drawings).

BRIEF DESCRIPTION OF THE DRAWINGS

FIGS. 4A to 4D are views each exemplifying a content disclosure range setting screen according to the embodiment;

FIG. 5 is a table showing an example of content disclosure ranges set in a distribution destination and distribution source according to the embodiment;

FIGS. 6A to 6C are flowcharts illustrating content disclosure range setting processing according to the first embodiment;

FIGS. 7A to 7C are flowcharts illustrating content disclosure range setting processing according to the second embodiment;

FIGS. 8A to 8C are flowcharts illustrating processing of displaying a content disclosure range setting screen according to the third embodiment.

DESCRIPTION OF THE EMBODIMENTS

Embodiments of the present invention will be described in detail below. The following embodiments are merely examples for practicing the present invention. The embodiments should be properly modified or changed depending on various conditions and the structure of an apparatus to which the present invention is applied. The present invention should not be limited to the following embodiments. Also, parts of the embodiments to be described later may be properly combined.

First Embodiment

A system according to the present invention will be described below according to an embodiment implemented by a system in which a mobile communication apparatus such as a smartphone or digital camera and an information processing apparatus such as a server apparatus are communicably connected via a network.

<System Configuration>

A system configuration according to this embodiment will be explained first with reference to FIG. 1.

Figure 1:
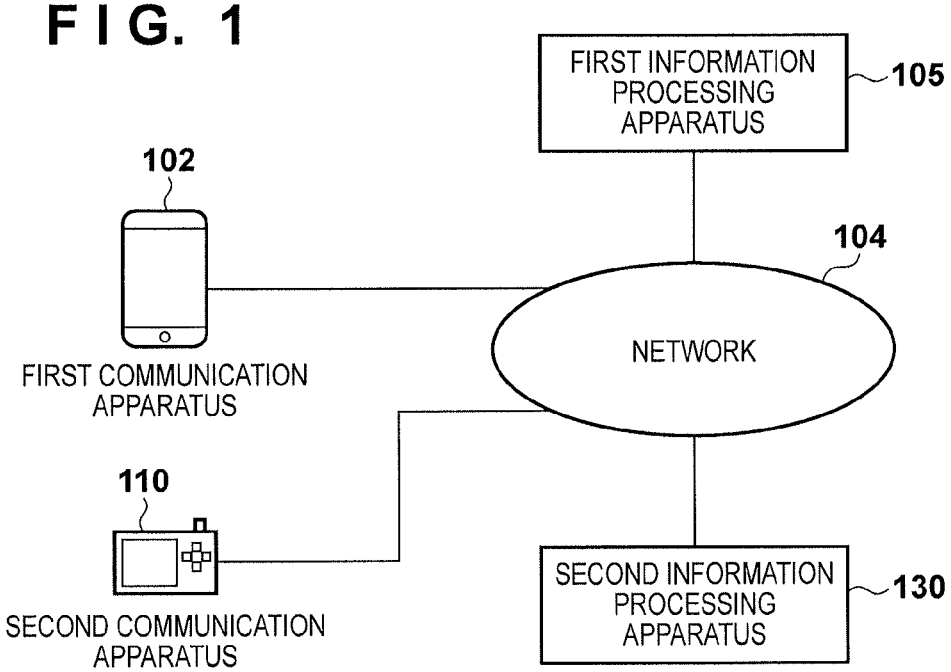
FIG. 1 is a view showing a system configuration according to an embodiment.

As shown in FIG. 1, in the system of this embodiment, a first communication apparatus 102, a first information processing apparatus 105, a second communication apparatus 110, and a second information processing apparatus 130 are communicably connected via a network 104.

The first information processing apparatus 105 is a computer server apparatus operated by a provider for providing an online album site or the like. A user terminal such as the second communication apparatus 110 (to be described later) uploads a content to the first information processing apparatus 105. The second information processing apparatus 130 is a computer server apparatus operated by a provider for providing a content providing service site or the like, and acquires the content uploaded from the user terminal to the first information processing apparatus 105 and distributes it to a third-party terminal.

The first communication apparatus 102 is a smartphone, a tablet terminal, a personal computer (PC), or the like, and can operate a Web browser program having a standard protocol capable of exchanging information via the network 104. The first communication apparatus 102 accesses the first information processing apparatus 105 or second information processing apparatus 130 using a protocol such as HTTP by operating the Web browser program, transmits information generated by a description language such as XML, and acquires and analyzes information generated by a description language such as HTML or XML. The first communication apparatus 102 displays, on a display, the information analyzed according to an instruction of the Web browser program.

The second communication apparatus 110 is a digital camera having a communication function, or the like, and can communicate with the first information processing apparatus 105 using a standard protocol capable of exchanging information via the network 104. The second communication apparatus 110 accesses the first information processing apparatus 105 using a protocol such as HTTP, transmits information generated by a description language such as XML, and acquires and analyzes information generated by a description language such as HTML or XML. The second communication apparatus 110 displays the analyzed information on a display.

When the first communication apparatus 102 makes settings about the second communication apparatus 110 in the first information processing apparatus 105 via the network 104, setting information about the second communication apparatus 110 is stored in the first information processing apparatus 105. The first information processing apparatus 105 stores and manages the setting information about the second communication apparatus 110 set by the first communication apparatus 102.

The second communication apparatus 110 acquires, via the network 104, the setting information managed by the first information processing apparatus 105, and operates according to the acquired setting information.

As described above, the first communication apparatus 102 and the second communication apparatus 110 can store and acquire setting information via the first information processing apparatus 105.

Furthermore, the first communication apparatus 102 and the second communication apparatus 110 can set a content disclosure range for the second information processing apparatus 130 via the first information processing apparatus 105. Setting information of the content disclosure range for the second information processing apparatus 130 is stored in the first information processing apparatus 105.

When the first communication apparatus 102 or the second communication apparatus 110 uploads a content to the first information processing apparatus 105, the first information processing apparatus 105 transfers the content to the second information processing apparatus 130. At this time, the setting information of the content disclosure range for the second information processing apparatus 130, which has been stored in the first information processing apparatus 105, is also transmitted from the first information processing apparatus 105 to the second information processing apparatus 130.

As described above, according to this embodiment, when a content uploaded from the first communication apparatus 102 or the second communication apparatus 110 to the first information processing apparatus 105 is transferred to the second information processing apparatus 130 via the first information processing apparatus 105, the content can also be distributed to the user of the second information processing apparatus 130.

<Apparatus Configuration>

Figure 2:
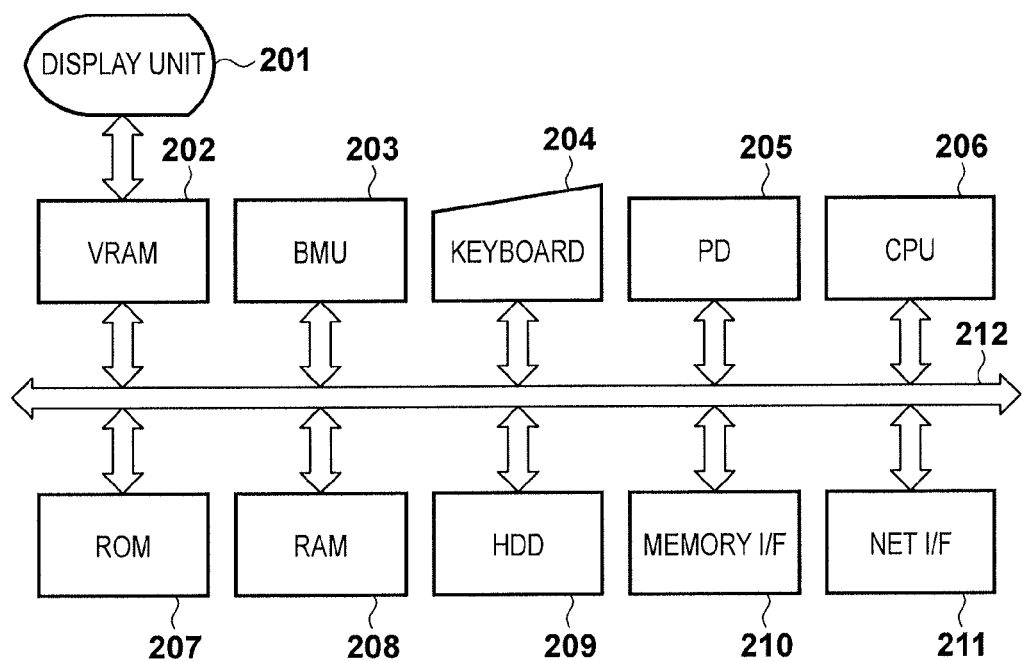
FIG. 2 is a block diagram showing the configuration of an information processing apparatus according to the embodiment.

Referring to FIG. 2, the configuration and functions of the first and second information processing apparatuses according to the present embodiment will be described.

As shown in FIG. 2, the first and second information processing apparatuses 105, 130 each includes display unit 201, VRAM 202, BMU 203, keyboard 204, PD 205, CPU 206, ROM 207, RAM 208, HDD 209, memory I/F 210, network I/F 211.

The display unit 201 displays user interface information such as management information, for example, setting information of a disclosure range of a content, icons, messages and menus.

The VRAM 202 renders image data for being displayed in the display unit 201. The image data generated in the VRAM 202 is transferred to the display unit 201 according to a predetermined rule, and, thereby, the display unit 201 displays an image.

The BMU (bit move unit) 203 controls data transfer, for example, between memories (e.g., between the VRAM 202 and another memory), and data transfer between a memory and I/O devices (e.g., network I/F 211).

The keyboard 204 includes various keys for inputting a document and the like.

The PD (pointing device) 205 is used for an instruction on an icon, a menu, and other content displayed in the display unit 201 or a drag and drop operation to an object displayed in the display unit 201.

The CPU 206 controls various devices based on an OS (Operating System) control programs stored in ROM 207 and HDD 209.

The ROM 207 stores various control programs and data.

The RAM 208 includes, for example, work areas for the CPU 206, data save areas used during error processing, and load areas for control programs.

The HDD (Hard Disk Drive) 209 stores control programs executed in the information processing apparatus, contents, and data.

The memory interface (I/F) 210 controls to read out and write data from/to an external storage medium such as USB memory.

The network interface (I/F) 211 controls to communicate with other information processing apparatus or printer and the like via a network.

The CPU bus 212 includes an address bus, a data bus, and a control bus.

A control program can be provided from the ROM 207 or HDD 209 to the CPU 206, or provided from another information processing apparatus or the like to the CPU 206 via a network using the network I/F 211.

<Device Configuration>

The configuration and functions of a digital camera which is taken as the first and second communication apparatuses will be described below with reference to FIG. 3.

Note that a case in which the first communication apparatus 102 and the second communication apparatus 110 are digital cameras (to be referred to as communication devices 300 hereinafter) each having a camera function and communication function will be described below. However, these apparatuses may be smartphones, tablet terminals, or PCs.

Figure 3:
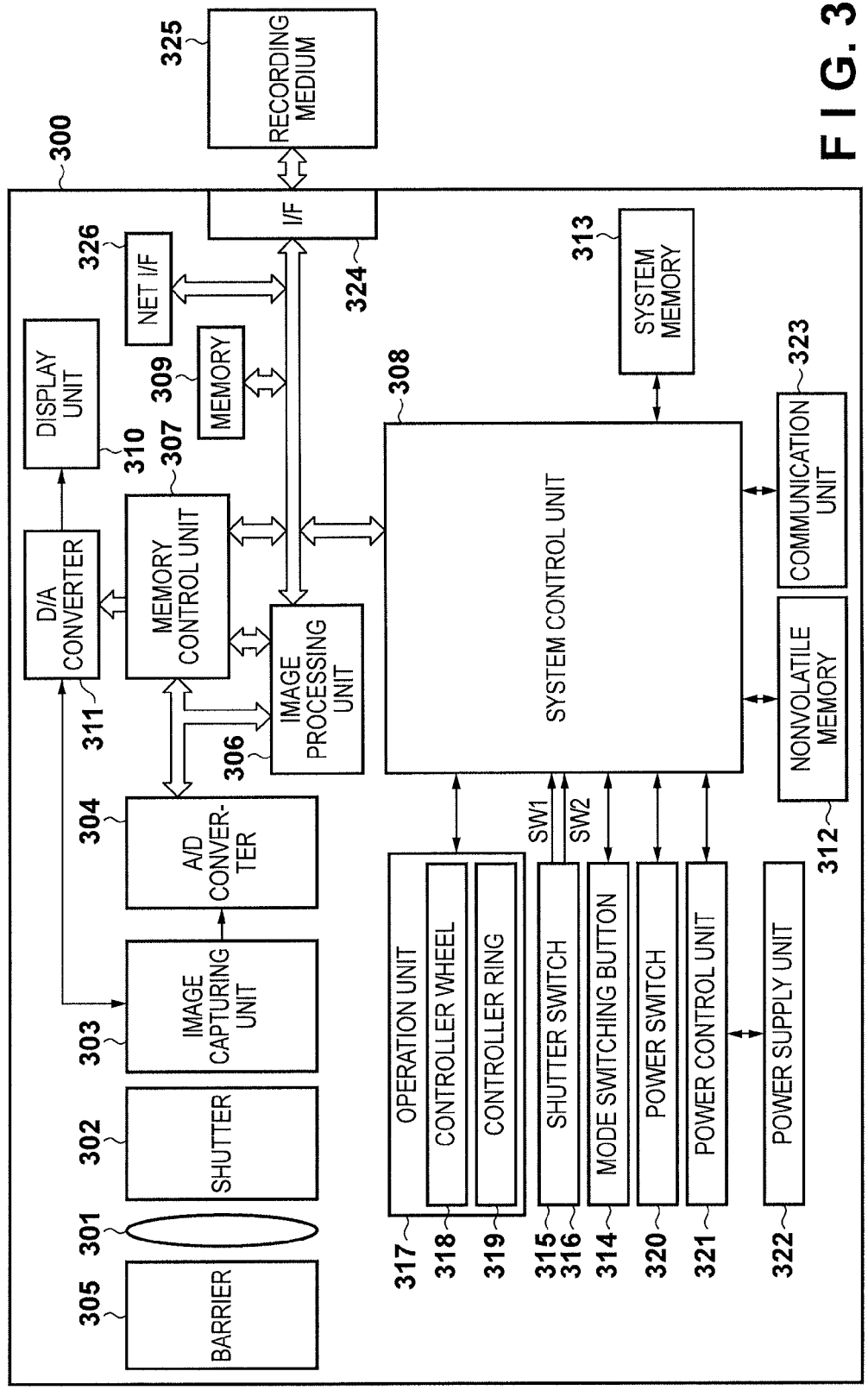
FIG. 3 is a block diagram showing the configuration of a communication apparatus according to the embodiment.

As shown in FIG. 3, a photographing lens 301 includes a lens group of a zoom lens and a focusing lens. A shutter 302 has a diaphragm function. An image capturing unit 303 is an image sensor, which is constituted by a CCD or CMOS or the like, for converting the optical image of an object to an electric signal. An A/D converter 304 converts an analog signal to a digital signal. The A/D converter 304 is used to convert an analog signal, which is output from the image capturing unit 303, to a digital signal. A barrier 305 covers the image capturing system (which includes the photographing lens 301) of the communication device 300, thereby preventing contamination of and damage to the image capturing system that includes the photographing lens 301, shutter 302 and image capturing unit 303.

An image processing unit 306 performs resizing processing, such as predetermined pixel interpolation and reduction, and color conversion processing, with respect to data from the A/D converter 304 or data from a memory control unit 307. Further, the image processing unit 306 performs predetermined calculation processing using the captured image data, and the system control unit 308 performs exposure control and distance measuring control based on the calculation results.

The data from the A/D converter 304 is directly written into a memory 309 via both the image processing unit 306 and the memory control unit 307 or via the memory control unit 307. The memory 309 stores the image data obtained from the image capturing unit 303 and converted into digital data by the A/D converter 304, and image data to be displayed on the display unit 310. The memory 309 has a storage capacity that is sufficient for storing a predetermined number of still images as well as moving images and audio for a predetermined time period.

The memory 309 also functions as a memory for image display (video memory). A D/A converter 311 converts the image display data stored in the memory 309 into an analog signal and supplies the analog signal with the display unit 310. In this manner, the image display data that was written into the memory 309 is displayed by the display unit 310 via the D/A converter 311. The display unit 310 performs, on a display device such as an LCD, display in accordance with the analog signal from the D/A converter 311. The digital signals converted by the A/D converter 304 and stored in the memory 309 are converted into analog signals by the D/A converter 311, and the analog signals are successively transmitted to the display unit 310 so as to be displayed thereon, making it possible to realize an electronic view finder (EVF) functionality and to perform through image display (live view display).

A nonvolatile memory 312 is, for example, an EEPROM, which is electrically erasable and recordable. In the nonvolatile memory 312, constants and programs, for example, for operating a system control unit 308 are stored. In this context, "programs" may refer to programs for executing various flowcharts that will be described later.

The system control unit 308 controls the entire communication device 300, and realizes, by executing the programs stored in the nonvolatile memory 312, the procedures of the flowchart that will be described later. The system memory 313 is, for example, a RAM and used also as a work memory where constants and variables for operating the system control unit 308, and the programs read out from the nonvolatile memory 312 are expanded. The system control unit 308 controls the memory 309, the D/A converter 311, the display unit 310, and the like, so as to perform display control.

A mode switching button 314, a first shutter switch 315, a second shutter switch 316, and operation units 317 are operation members for inputting various types of instructions into the system control unit 308.

The mode switching button 314 switches the operation mode of the system control unit 308 to any of a still image shooting mode, a moving image recording mode, and a reproduction mode.

While the shutter button provided on the communication device 300 is being operated, that is, pressed half-way (the shooting preparation instruction), the first shutter switch 315 is turned on and generates a first shutter switch signal SW1. Upon receiving the first shutter switch signal SW1, the system control unit 308 starts the AF (Automatic Focus) processing, the AE (Automatic Exposure) processing, the AWB (Automatic White Balance) processing, the EF (flash pre-emission) processing and the like.

When the operation of the shutter button is completed, that is, the shutter button is pressed fully (the shooting instruction), the second shutter switch 316 is turned on and generates a second shutter switch signal SW2. Upon receiving the second shutter switch signal SW2, the system control unit 308 starts a series of shooting processing from reading out the signal from the image capturing unit 303 to writing of image data to the recording medium 325.

By selecting various functional icons displayed on the display unit 310, appropriate functions for each situation are assigned to each operation member of the operation units 317, and the operation units 317 thus act as various function buttons. Examples of these function buttons include an execution button, an end button, a back button, an image scrolling button, a jump button, a narrow-down button, an attribute change button. For example, a menu screen that enables various settings to be made is displayed on the display unit 310 by pressing a menu button. The user can make various settings intuitively by using the menu screen, which is displayed on the display unit 310, four-direction (up, down, left, right) buttons and a SET button.

Included among the operation units 317 is also a touch panel as a touch detecting unit capable of detecting a touch operation on the display unit 310.

Further, the operation units 317 include a controller wheel 318 and a controller ring 319 which are rotatable operation members.

The controller wheel 318 is used together with the direction buttons as when a selection item is specified. When the controller wheel 318 is turned, an electrical pulse signal is generated in accordance with the amount of rotation, and the system control unit 308 controls each unit of the communication device 300 based upon the pulse signal. The angle through which the controller wheel 318 has been turned and how many times it has been turned can be determined by the pulse signal. It should be noted that the controller wheel 318 can be any operating member so long as it is an operating member whose rotation can be detected. For example, it can be a dial operating member in which the controller wheel 318 per se is rotated to generate the pulse signal in accordance with a turning operation by the user. Further, it can be a device (a so-called touch wheel) that detects an operation such as the revolution of the user's finger on the controller wheel 318 without by the controller wheel 318 itself being rotated.

The controller ring 319 is an operation member around a lens barrel, that is rotatable about an optical axis. When the controller ring 319 is operated, an electrical pulse signal corresponding to an amount of rotation (an amount of operation) is generated. The system control unit 308 controls each unit of the communication device 300 based on the pulse signal. When the function switching button of the controller ring 319 is pressed, a menu screen for allowing the user to change a function assigned to the controller ring 319 is displayed on the display unit 310. The controller ring 319 and the controller wheel 318 are used to select a normal mode item and change a value.

A power switch 320 switches between power on and power off of the communication device 300.

A power control unit 321 is constituted by, for example, a battery detection circuit, a DC-DC converter, a switch circuit for changing over the block to be supplied with power, and detects a battery has been inserted or not, the type of the battery, and the residual capacity thereof. Further, the power control unit 321 controls the DC-DC converter in accordance with the detection results and an instruction of the system control unit 308, and supplies a necessary voltage for a necessary length of time to each of the units including a recording medium 325.

A power supply unit 322 comprises a primary battery such as an alkaline battery or a lithium battery, a secondary battery such as a NiCd battery, a NIMH battery, or a Li ion battery, or an AC adaptor.

A recording medium interface (I/F) 324 is for interfacing with the recording medium 325 such as the memory card or hard disk. The recording medium 325 is a recording medium such as a memory card for recording shot images, and constituted by a semiconductor memory, a magnetic disk, or the like.

A communication unit 323 transmits/receives a video and audio to/from an external apparatus communicably connected by a wireless antenna or wired cable.

A network I/F 326 can be connected to the network 104 such as a wireless LAN or the Internet, and can transmit, to an external apparatus, an image (including a through image) captured by the image capturing unit 303 and an image file recorded in the recording medium 325, and receive image data and other various kinds of information from an external apparatus.

Note that examples of the external apparatus are the first communication apparatus 102, first information processing apparatus 105, second communication apparatus 110, and second information processing apparatus 130.

<Disclosure Range Setting Screen>

A menu screen for setting a content disclosure range for the second information processing apparatus from the first and second communication apparatuses via the first information processing apparatus will be described with reference to FIGS. 4A to 4D.

FIG. 4A exemplifies a screen 401 for setting a content disclosure range for the second information processing apparatus 130 from the first communication apparatus 102 or second communication apparatus 110. By designating one of setting items 402, 403, and 404, a content is distributed within the designated disclosure range. Reference numeral 405 denotes a button for confirming the disclosure range designated by one of the setting items 402, 403, and 404; and 406, a button for canceling setting of the disclosure range.

FIG. 4B exemplifies a screen 407 for setting a content disclosure range for the first information processing apparatus 105 from the first communication apparatus 102 or second communication apparatus 110. By designating one of setting items 408, 409, and 410, a content is distributed within the designated disclosure range. Reference numeral 411 denotes a button for confirming the disclosure range designated by one of the setting items 408, 409, and 410; and 412, a button for canceling setting of the disclosure range.

FIG. 4C exemplifies a disclosure range setting screen 413 that is displayed when the first communication apparatus 102 or second communication apparatus 110 uploads a content. Setting items 414 correspond to the setting items 408, 409, and 410 of FIG. 4B. By designating one of the setting items 414, the content is distributed to the second information processing apparatus 130 via the first information processing apparatus 105 within the designated disclosure range.

FIG. 4D exemplifies a warning screen 415 displayed when an input operation is accepted from the first communication apparatus 102 or second communication apparatus 110 and a content disclosure range is set in the first information processing apparatus 105. Reference numeral 416 denotes a link destination for which access information (URL) for accessing a disclosure range page used to set a content disclosure range in the second information processing apparatus 130 is set; 417, a check box for setting ON not to display the warning screen 415 from the next time; and 418, a button for closing the warning screen 415.

In this way, it is warned that it is impossible to set a content disclosure range settable for the first information processing apparatus 105 to be wider than that set for the second information processing apparatus 130.

This allows the user to readily recognize that a disclosure range set in a content distribution destination is applied instead of a content disclosure range set in a content distribution source.

In this embodiment, the second information processing apparatus 130 can set a different content disclosure range independently of the content disclosure range stored in the first information processing apparatus 105. The user can access the second information processing apparatus 130 using the first communication apparatus 102 to set a content disclosure range, or the second information processing apparatus 130 can automatically set a predetermined content disclosure range. Therefore, the first disclosure range stored in the first information processing apparatus 105 may be different from the second disclosure range stored in the second information processing apparatus 130. In this case, the second information processing apparatus 130 distributes a content transferred from the first information processing apparatus 105 to a third-party terminal within a disclosure range decided according to a table shown in FIG. 5.

FIG. 5 exemplifies a content disclosure range setting list 501 indicating the relationship between the first disclosure range of the first information processing apparatus 105 (distribution source) and the second disclosure range of the second information processing apparatus 130 (distribution destination). In this embodiment, FIG. 5 shows that a narrower (smaller) one of the first disclosure range and the second disclosure range is selected. Settings 502, 503, and 504 indicate that the second disclosure range is preferentially selected since the second disclosure range is narrower than the first disclosure range. With respect to the screens shown in FIGS. 4A to 4D, when the disclosure range setting item 404 is selected in FIG. 4A and the disclosure range setting items 408, 409, or 410 is selected in FIG. 4B, even if "nobody" is selected from the setting items 414 in FIG. 4C, "just me" is set. Note that a rule for deciding a final disclosure range is not limited to this. For example, a wider one of the first disclosure range and the second disclosure range may be decided as a final disclosure range.

<Setting of Content Disclosure Range>

Content disclosure range setting processing executed by the first communication apparatus or the second communication apparatus, the first information processing apparatus, and the second information processing apparatus will be described with reference to FIGS. 6A to 6C.

Figure 6A:
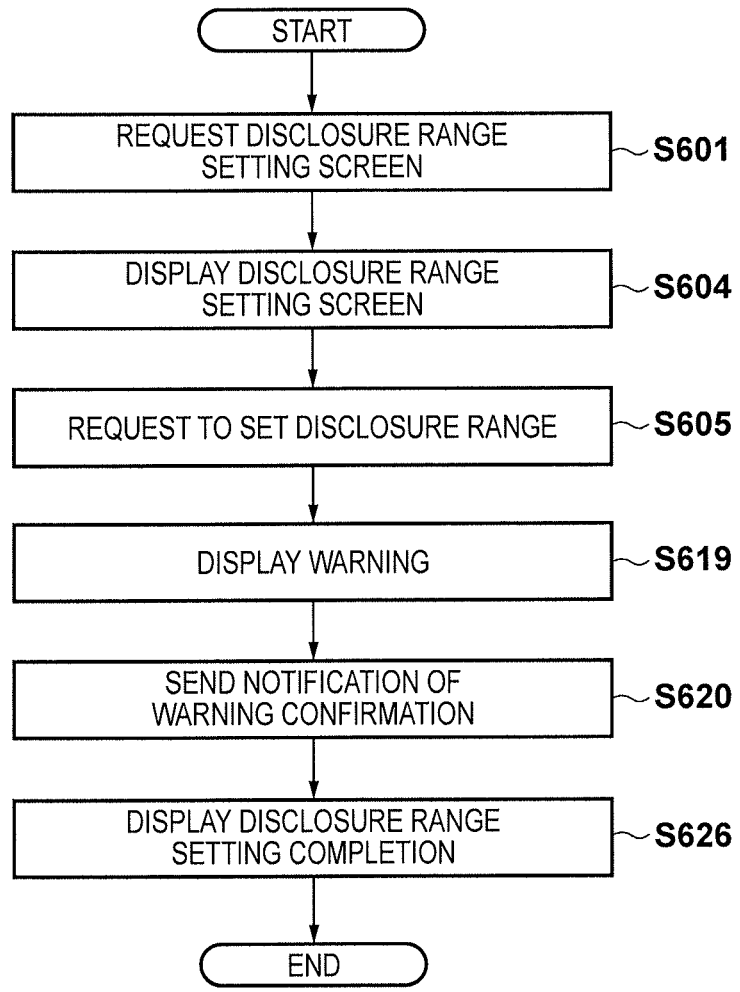
Figure 6C:
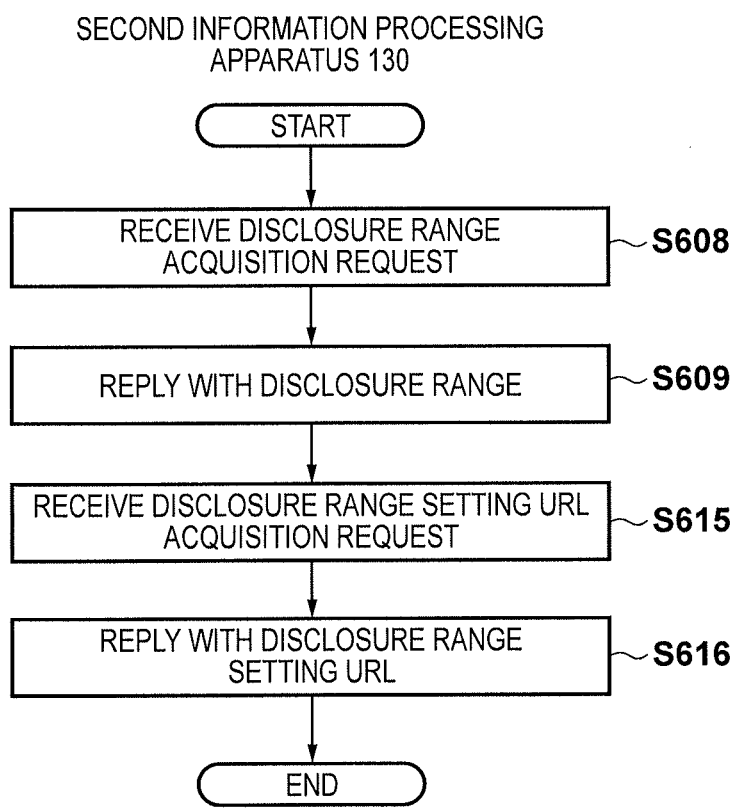

FIG. 6A shows the operation of the first communication apparatus 102 or the second communication apparatus 110. FIG. 6B shows the operation of the first information processing apparatus 105. FIG. 6C shows the operation of the second information processing apparatus 130. Assume that the first communication apparatus 102 executes processing shown in FIG. 6A.

In step S601, the first communication apparatus 102 requests, of the first information processing apparatus 105, a content disclosure range setting screen.

In step S602, the first information processing apparatus 105 receives the request of the setting screen from the first communication apparatus 102.

In step S603, in response to the request from the first communication apparatus 102, the first information processing apparatus 105 replies with the setting screen.

In step S604, the first communication apparatus 102 displays the setting screen received from the first information processing apparatus 105 (for example, the setting screen 407 of FIG. 4B).

In step S605, the first communication apparatus 102 requests the first information processing apparatus 105 to set a content disclosure range. In the example shown in FIG. 4B, when one of the setting items 408, 409, and 410 is designated and the setting button 411 is pressed in the first communication apparatus 102, the first disclosure range information indicating the designated setting item and the corresponding content disclosure range is transmitted as the request from the first communication apparatus 102 to the first information processing apparatus 105.

In step S606, the first information processing apparatus 105 receives the content disclosure range setting request from the first communication apparatus 102. The disclosure range setting request contains the above-described first disclosure range information.

In step S607, the first information processing apparatus 105 requests the second information processing apparatus 130 to acquire the second disclosure range information indicating a content disclosure range set in the second information processing apparatus 130.

In step S608, the second information processing apparatus 130 receives the second disclosure range information acquisition request from the first information processing apparatus 105.

In step S609, in response to the request from the first information processing apparatus 105, the second information processing apparatus 130 replies to the first information processing apparatus 105 with the second disclosure range information. Note that the second disclosure range information is set when the user accesses the second information processing apparatus 130 using the user terminal such as the first communication apparatus 102 or another communication apparatus, and performs an input operation according to the screen shown in FIG. 4A. In the example shown in FIG. 4A, when one of the setting items 402, 403, and 404 is designated and the setting button 405 is pressed in the second information processing apparatus 130, the second disclosure range information indicating the designated setting item and the corresponding content disclosure range is transmitted from the user terminal to the second information processing apparatus 130. Note that setting of the second disclosure range information in the second information processing apparatus 130 can be made by the user at an arbitrary timing independently of the processing shown in FIGS. 6A to 6C, and can be made before execution of step S601 of this embodiment.

In step S610, the first information processing apparatus 105 receives the second disclosure range information from the second information processing apparatus 130.

In step S611, the first information processing apparatus 105 compares the first disclosure range information received in step S606 with the second disclosure range information received in step S610, and determines whether the first disclosure range information is narrower than the second disclosure range information. If it is determined that the first disclosure range information is equal to or wider than the second disclosure range information (NO in step S611), the process advances to step S623. If the first disclosure range information is narrower than the second disclosure range information (YES in step S611), the process advances to step S612. In the example of FIG. 5, if setting of the disclosure range corresponds to the setting 502, 503, or 504, it is determined that the first disclosure range information is narrower than the second disclosure range information. That is, in step S611, it is determined based on the above-described comparison result whether the first disclosure range set in the first information processing apparatus 105 is applied when a content uploaded to the first information processing apparatus 105 and transferred to the second information processing apparatus 130 is distributed to a third-party terminal. If the first disclosure range is applied, the process advances to step S623; otherwise, the process advances to step S612.

In step S612, the first information processing apparatus 105 compares the first disclosure range information received in step S610 with the preceding first disclosure range information recorded as a history. If the first disclosure range information has been changed, the process advances to step S614; otherwise, the process advances to step S613. Note that if no preceding first disclosure range information is held, it is determined that no change has been made.

With this processing, even if the user has set the warning screen in a non-display state in the preceding disclosure range setting processing, if the disclosure range has been changed (YES in step S612), the processing in step S613 is skipped, and it is thus possible to display the warning screen, thereby allowing the user to readily recognize the correct disclosure range.

If it is determined in step S613 that the display setting of the warning screen is set to the non-display state, the first information processing apparatus 105 advances to step S623; otherwise, the first information processing apparatus 105 advances to step S614. In the example shown in FIG. 4D, it is determined whether the check box 417 has been checked in the warning screen 415 displayed in the preceding disclosure range setting processing.

As described above, by setting the display setting of the warning screen to the non-display state in the preceding disclosure range setting processing, it is possible to prevent the warning screen from being displayed in the disclosure range setting processing this time. This prevents the warning screen from being repeatedly displayed to the user who already knows conditions under which the content disclosure range is set, thereby omitting the labor of the user. Thus, the usability improves.

In step S614, the first information processing apparatus 105 requests the second information processing apparatus 130 to acquire the URL of a setting screen page for changing the second disclosure range information.

In step S615, the second information processing apparatus 130 receives, from the first information processing apparatus 105, the request to acquire the URL of the disclosure range setting screen page.

In step S616, in response to the request from the first information processing apparatus 105, the second information processing apparatus 130 replies with the URL of the disclosure range setting screen page.

In step S617, the first information processing apparatus 105 receives the URL of the disclosure range setting screen page from the second information processing apparatus 130. Note that when the first information processing apparatus 105 holds the URL of the disclosure range setting screen page in advance, it is possible to omit steps S614 to S617.

In step S618, the first information processing apparatus 105 replies to the first communication apparatus 102 with the warning screen. This warning screen includes a predetermined message, and includes, as a link destination, the URL of the disclosure range setting screen page received in step S617. In the example shown in FIG. 4D, the URL of the disclosure range setting screen page is set as the link destination 416. The predetermined message indicates that the content uploaded to the first information processing apparatus 105 and transferred to the second information processing apparatus 130 is distributed to a third-party terminal that falls outside the first disclosure range set in the first information processing apparatus 105 but within the second disclosure range set in the second information processing apparatus 130.

With this processing, the first communication apparatus 102 can access the second information processing apparatus 130 using the URL of the setting screen page on the warning screen displayed on the display unit 201, and refer to the setting contents of the second content disclosure range information and also edit it to desired setting contents.

In step S619, the first communication apparatus 102 displays the warning screen received from the first information processing apparatus 105. After the user confirms warning contents on the warning screen 415, he/she presses the close button 418 to close the warning screen 415.

In step S620, the first communication apparatus 102 notifies the first information processing apparatus 105 that the warning screen has been confirmed. At this time, the first communication apparatus 102 also notifies the first information processing apparatus 105 of information about the setting state indicating whether the check box 417 of the warning screen 415 has been turned on.

In step S621, the first information processing apparatus 105 receives the notification that the warning screen has been confirmed.

In step S622, the first information processing apparatus 105 stores the setting state of the check box 417 of the warning screen.

In step S623, the first information processing apparatus 105 stores the second disclosure range information received in step S610.

In step S624, the first information processing apparatus 105 stores the first disclosure range information received in step S606.

In step S625, the first information processing apparatus 105 transmits a disclosure range setting completion screen to the first communication apparatus 102.

In step S626, the first communication apparatus 102 displays the setting completion screen received from the first information processing apparatus 105 on the display unit 201.

With this processing, when the content uploaded to the first information processing apparatus 105 and transferred to the second information processing apparatus 130 is distributed to a third-party terminal, if not the content disclosure range set in the first information processing apparatus 105 but the content disclosure range set in the second information processing apparatus 130 is applied, the user can readily recognize it.

Second Embodiment

Content disclosure range setting processing according to the second embodiment, that is executed by the first communication apparatus or the second communication apparatus, the first information processing apparatus, and the second information processing apparatus, will be described with reference to FIGS. 7A to 7C.

Figure 7C:
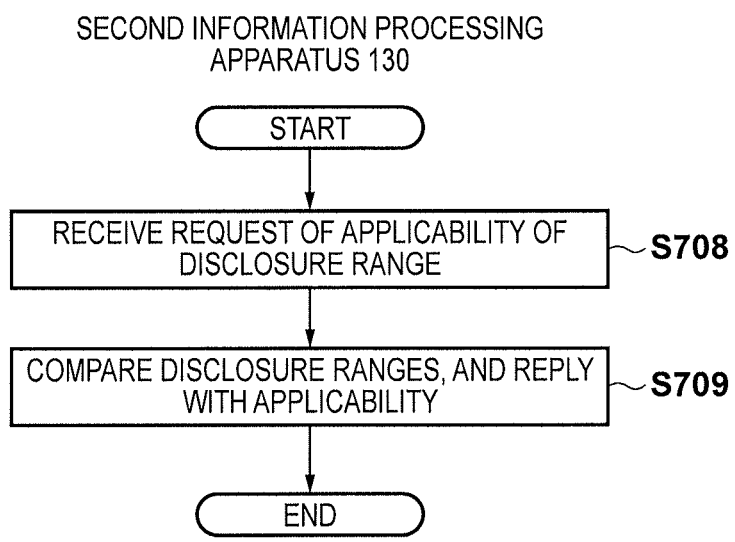

FIG. 7A shows the operation of a first communication apparatus 102 or a second communication apparatus 110. FIG. 7B shows the operation of a first information processing apparatus 105. FIG. 7C shows the operation of a second information processing apparatus 130. Assume that the first communication apparatus 102 executes processing shown in FIG. 7A.

Note that processes in steps S701, S704, S705, S713, S714, and S718 of FIG. 7A are the same as those in steps S601, S604, S605, S619, S620, and S626 of FIG. 6A. Processes in steps S702, S703, S706, S715, S716, and S717 of FIG. 7B are the same as those in steps S602, S603, S606, S618, S621, S624, and S625 of FIG. 6B. The difference from FIGS. 6A to 6C will be mainly described below.

In step S707, the first information processing apparatus 105 transmits, to the second information processing apparatus 130, a request about the applicability of a content disclosure range. This request contains the first disclosure range information set in the above-described first information processing apparatus 105 and indicating the stored content disclosure range.

In step S708, the second information processing apparatus 130 receives the request about the applicability of the disclosure range from the first information processing apparatus 105.

In step S709, the second information processing apparatus 130 compares a disclosure range indicated by the first disclosure range information received from the first communication apparatus 102 with a disclosure range set in the second information processing apparatus 130, and determines the applicability of the first disclosure range information, thereby replying with a determination result.

In step S710, the first information processing apparatus 105 receives the applicability of the disclosure range from the second information processing apparatus 130.

In step S711, if the first information processing apparatus 105 determines based on the applicability of the disclosure range received in step S710 that the disclosure range indicated by the first disclosure range information can be applied, the process advances to step S716; otherwise, the process advances to step S712.

With this processing, when a content uploaded to the first information processing apparatus 105 and transferred to the second information processing apparatus 130 is distributed to a third-party terminal, it is possible to send a notification to the user based on the result obtained when the second information processing apparatus 130 determines the applicability of the disclosure range set in the first information processing apparatus 105.

Third Embodiment

Processing of displaying a content disclosure range setting screen according to the third embodiment, that is executed by the first communication apparatus or the second communication apparatus, the first information processing apparatus, and the second information processing apparatus, will be described with reference to FIGS. 8A to 8C.

Figure 8A:
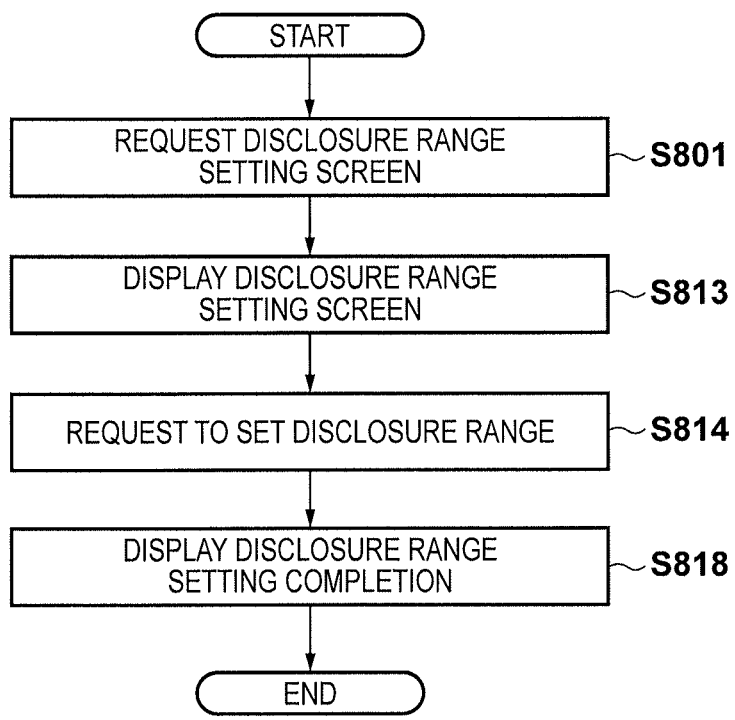
Figure 8C:
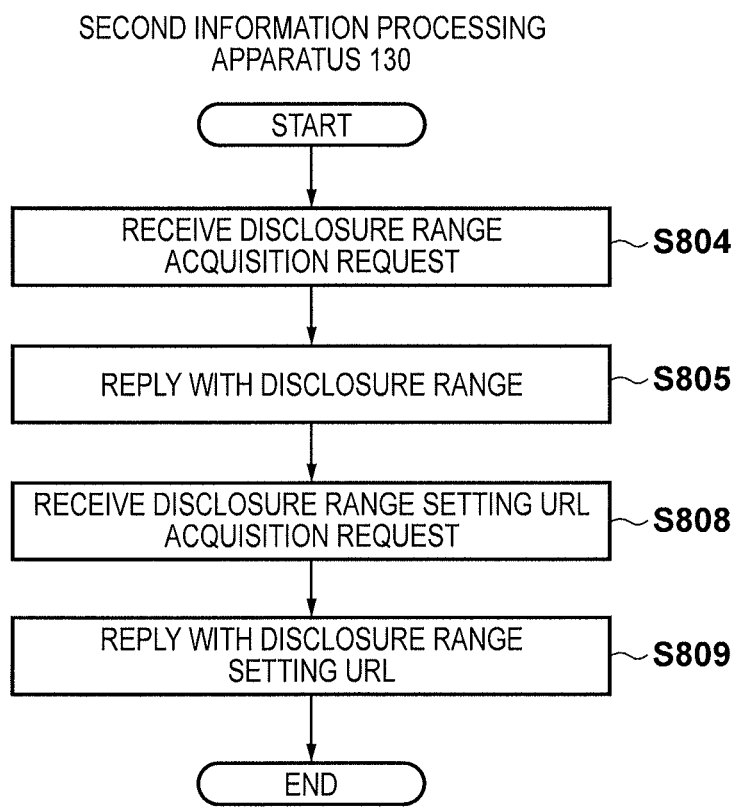

FIG. 8A shows the operation of a first communication apparatus 102 or a second communication apparatus 110. FIG. 8B shows the operation of a first information processing apparatus 105. FIG. 8C shows the operation of a second information processing apparatus 130. Assume that the first communication apparatus 102 executes processing shown in FIG. 8A.

Note that processes in steps S801, S813, S814, and S818 of FIG. 8A are the same as those in steps S601, S604, S605, and S626 of FIG. 6A. Processes in steps S804, S805, S808, and S809 of FIG. 8C are the same as those in steps S608, S609, S615, and S616 of FIG. 6C. The difference from FIGS. 6A to 6C will be mainly described below.

In step S802, the first information processing apparatus 105 receives a request of a disclosure range setting screen from the first communication apparatus 102.

In step S803, the first information processing apparatus 105 requests the second information processing apparatus 130 to acquire the second disclosure range information indicating a content disclosure range set in the second information processing apparatus 130.

In step S806, the first information processing apparatus 105 receives the second disclosure range information from the second information processing apparatus 130.

In step S807, the first information processing apparatus 105 requests the second information processing apparatus 130 to acquire the URL of a setting screen page for changing the second disclosure range information.

In step S810, the first information processing apparatus 105 receives the URL of the disclosure range setting screen page from the second information processing apparatus 130.

In step S811, the first information processing apparatus 105 obtains a disclosure range settable by the first communication apparatus 102 based on the second disclosure range information received from the second information processing apparatus 130. In the example shown in FIG. 5, a settable disclosure range other than the settings 502, 503, and 504 is obtained so that the disclosure range of the settings 502, 503, and 504 cannot be set.

In step S812, the first information processing apparatus 105 replies to the first communication apparatus 102 with data of the disclosure range setting screen. The data of the disclosure range setting screen prevents a disclosure range other than the settable disclosure range obtained in step S811 from being selected by setting it in a non-display state or graying it out, thereby disabling the user from setting an unsettable disclosure range in the setting screen displayed in step S813.

In step S815, the first information processing apparatus 105 receives a disclosure range setting request from the first communication apparatus 102.

In step S816, the first information processing apparatus 105 stores the disclosure range setting information received in step S815.

In step S817, the first information processing apparatus 105 replies with a disclosure range setting completion screen.

With this processing, when a content uploaded to the first information processing apparatus 105 and transferred to the second information processing apparatus 130 is distributed to a third-party terminal, it is possible to prevent, in advance, the user from setting a disclosure range that is not applied in the first information processing apparatus 105.

Fourth Embodiment

Figure 9C:
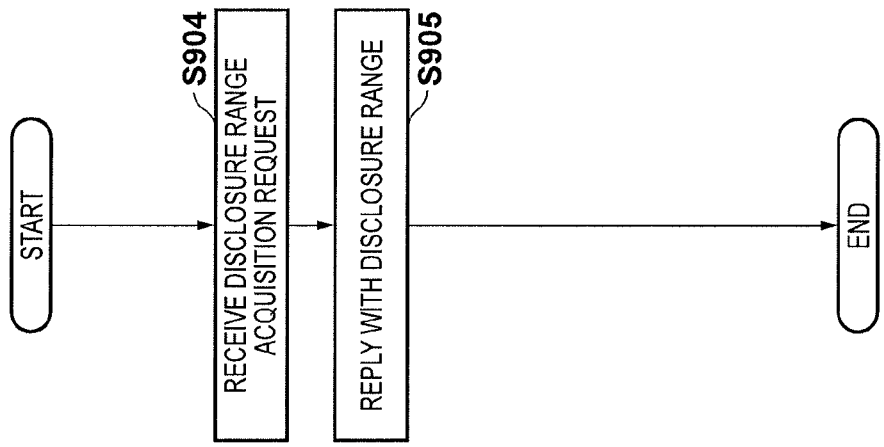
FIGS. 9A to 9C are flowcharts illustrating processing of acquiring a content disclosure range setting item according to the fourth embodiment.
Figure 9B:
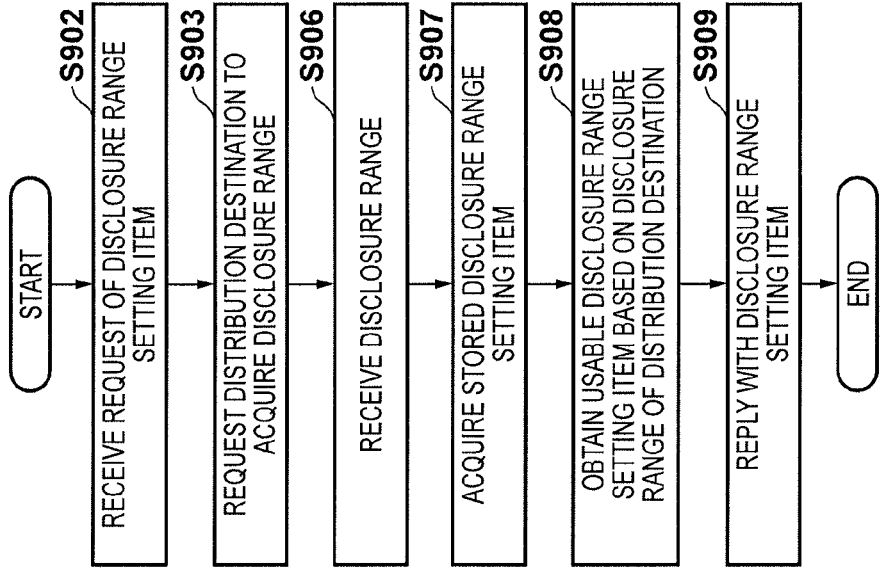

Processing of acquiring a content disclosure range setting item according to the fourth embodiment, that is executed by the first communication apparatus or the second communication apparatus, the first information processing apparatus, and the second information processing apparatus, will be described with reference to FIGS. 9A to 9C.

Figure 9A:
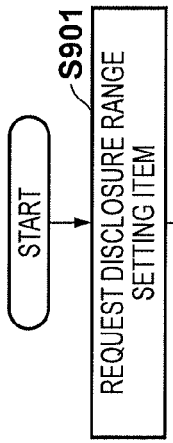

FIG. 9A shows the operation of a first communication apparatus 102 or a second communication apparatus 110. FIG. 9B shows the operation of a first information processing apparatus 105. FIG. 9C shows the operation of a second information processing apparatus 130. Assume that the first communication apparatus 102 executes processing shown in FIG. 9A.

In step S901, the first communication apparatus 102 requests, of the first information processing apparatus 105, a disclosure range setting item.

In step S902, the first information processing apparatus 105 receives the request of the disclosure range setting item from the first communication apparatus 102.

In step S903, the first information processing apparatus 105 requests the second information processing apparatus 130 to acquire the second disclosure range information stored in the second information processing apparatus 130.

In step S904, the second information processing apparatus 130 receives the second disclosure range information acquisition request from the first information processing apparatus 105.

In step S905, in response to the request from the first information processing apparatus 105, the second information processing apparatus 130 replies with the second disclosure range information.

In step S906, the first information processing apparatus 105 receives the second disclosure range information from the second information processing apparatus 130.

In step S907, the first information processing apparatus 105 acquires a disclosure range setting item stored in the second communication apparatus 110.

In step S908, the first information processing apparatus 105 obtains a disclosure range setting item settable by the first communication apparatus 102 based on a disclosure range indicated by the second disclosure range information received in step S906 and the disclosure range setting item acquired in step S907.

In step S909, the first information processing apparatus 105 replies to the first communication apparatus 102 with the disclosure range setting item obtained in step S908.

In step S910, the first communication apparatus 102 displays the settable disclosure range setting item received from the first information processing apparatus 105. In the example shown in FIG. 4C, among setting items 414, an unsettable setting item is set in a non-display state or grayed out, thereby disabling the user from setting it.

With this processing, when a content uploaded to the first information processing apparatus 105 and transferred to the second information processing apparatus 130 is distributed to a third-party terminal, it is possible to prevent, in advance, the user from setting a disclosure range that is not applied in the first information processing apparatus 105.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD™), a flash memory device, a memory card, and the like.

While the present invention has been described with reference to exemplary embodiments, it is to be understood that the invention is not limited to the disclosed exemplary embodiments. The scope of the following claims is to be This application claims the benefit of Japanese Patent Application Nos. 2013-230524, filed Nov. 6, 2013 and 2014-213984, filed Oct. 20, 2014, which are hereby incorporated by reference herein in their entirety.

What is claimed is:

1. A system in which at least one communication apparatus and a plurality of server apparatuses are communicably connected,
the communication apparatus including a setting unit configured to set a content disclosure range for a second server apparatus via a first server apparatus,
each of the plurality of server apparatuses including a storage unit configured to store a content acquired from the communication apparatus in a storage medium, a memory and at least one processor which function as a setting unit configured to set a content disclosure range, a communication unit configured to transmit/receive the content between the first server apparatus and the second server apparatus, and a distribution unit configured to distribute the content from the second server apparatus to a third-party terminal, the first server apparatus stores setting information of the content disclosure range which has been set in the second server apparatus, and the second server apparatus distributes the content transferred from the first server apparatus to the third-party terminal within a content disclosure range set in the second server apparatus,
wherein the memory and the processor further function as:
a comparison unit configured to compare a content disclosure range set by the setting unit of the communication apparatus with a content disclosure range which has been set by the setting unit of the second server apparatus, when the first server apparatus transfers a content acquired from the communication apparatus to a second server apparatus; and
a notification unit configured to send a notification to the communication apparatus based on a result of the comparison,
wherein the notification unit sends the notification, if the result of the comparison indicates that the content disclosure range set by the setting unit of the communication apparatus is different from the content disclosure range set by the setting unit of the second server apparatus,
wherein the distribution unit distributes the content to the third-party terminal included in a content disclosure range set based on the result of the comparison in the second server apparatus.

2. A control method for a server apparatus communicable with a communication apparatus which sends a content to the server apparatus and an external apparatus, which distributes a content transferred from the server apparatus to a third-party terminal via a network, comprising:
receiving a content from the communication apparatus;
transferring the content to the external apparatus;
acquiring a content disclosure range set by the communication apparatus;
acquiring a content disclosure range which has been set in the external apparatus from the external apparatus;
comparing the content disclosure range set by the communication apparatus with the content disclosure range which has been set in the external apparatus, when the server apparatus transfers a content acquired from the communication apparatus to the external apparatus; and
selectively executing notification to the communication apparatus based on a result of the comparison,
wherein in the executing the notification, if the result of the comparison indicates that the content disclosure range set by the communication apparatus is different from the content disclosure range which has been set in the external apparatus, the notification is executed.

3. A method according to claim 2,
wherein in the executing the notification, if it is determined based on the result of the comparison that the content is distributed to a third-party terminal included in a content disclosure range different from the content disclosure range set by the communication apparatus, the notification is executed.

4. A method according to claim 2,
wherein in the executing the notification, if the result of the comparison indicates that the content disclosure range set by the communication apparatus is wider than the content disclosure range which has been set in the external apparatus, the notification is executed.

5. A method according to claim 2,
wherein in the executing the notification, in accordance with the result of the comparison, the communication apparatus is selectively notified of address information for accessing a screen for changing the content disclosure range which has been set in the external apparatus.

6. A control method for a server apparatus communicable with a communication apparatus and an external apparatus which distributes a content transferred from the server apparatus to a third-party terminal via a network, comprising:
receiving a content from the communication apparatus;
transferring the content to the external apparatus;
acquiring a content disclosure range set by the communication apparatus;
transmitting the content disclosure range set by the communication apparatus to the external apparatus;
receiving a result of comparing the content disclosure range set by the communication apparatus with a content disclosure range which has been set in the external apparatus, when the server apparatus transfers a content acquired from the communication apparatus to the external apparatus; and
selectively executing notification to the communication apparatus based on the result of the comparison,
wherein in the executing the notification, if the result of the comparison indicates that the content disclosure range set by the communication apparatus is different from the content disclosure range which has been set in the external apparatus, the notification is executed.

7. A method according to claim 6,
wherein in the executing the notification, if it is determined based on the result of the comparison that the content is distributed to a third-party terminal included in a content disclosure range different from the content disclosure range set by the communication apparatus, the notification is executed.

8. A method according to claim 6,
wherein in the executing the notification, if the comparison result indicates that the content disclosure range set by the communication apparatus is wider than the content disclosure range which has been set in the external apparatus, the notification is executed.

9. A method according to claim 6,
wherein in the executing the notification, in accordance with the result of the comparison, the communication apparatus is selectively notified of address information for accessing a screen for changing the content disclosure range which has been set in the external apparatus.

10. A control method for an server apparatus communicable with a communication apparatus which sends a content to the server apparatus and an external apparatus, which distributes a content transferred from the server apparatus to a third party terminal via a network, comprising:
receiving a content from the communication apparatus;
transferring the content to the external apparatus;
acquiring a content disclosure range which has been set in the external apparatus from the external apparatus;
transmitting a notification to the communication apparatus if the content disclosure range which has been set in the external apparatus is different from a content disclosure range which has been set in the server apparatus, when the server apparatus transfers a content acquired from the communication apparatus to the external apparatus;
transmitting a setting screen, based on the content disclosure range settable by the server apparatus, for setting a content disclosure range in the server apparatus to the communication apparatus;
storing a content disclosure range input according to the setting screen; and
transferring the content disclosure range input according to the setting screen to the external apparatus.

11. A method according to claim 10,
wherein the setting screen is in a state in which it is impossible to set a content disclosure range wider than the content disclosure range which has been set in the external apparatus.

12. A server apparatus communicable with a communication apparatus which sends a content to the server apparatus and an external apparatus which distributes a content transferred from the server apparatus to a third-party terminal via a network, comprising:
a memory; and
a processor configured to execute, in accordance with program codes stored in the memory,
receiving a content from the communication apparatus,
transferring the content to the external apparatus,
acquiring a content disclosure range set by the communication apparatus,
acquiring a content disclosure range which has been set in the external apparatus from the external apparatus,
comparing the content disclosure range set by the communication apparatus with the content disclosure range which has been set in the external apparatus, when the server apparatus transfers a content acquired from the communication apparatus to the external apparatus, and
selectively executing notification to the communication apparatus based on a result of the comparison,
wherein in the executing the notification, if the result of the comparison indicates that the content disclosure range set by the communication apparatus is different from the content disclosure range which has been set in the external apparatus, the notification is executed.

13. A server apparatus communicable with a communication apparatus and an external apparatus which distributes a content transferred from the server apparatus to a third-party terminal via a network, comprising:
a memory; and
a processor configured to execute, in accordance with program codes stored in the memory,
receiving a content from the communication apparatus,
transferring the content to the external apparatus,
acquiring a content disclosure range set by the communication apparatus,
transmitting the content disclosure range set by the communication apparatus to the external apparatus,
receiving a result of comparing the content disclosure range set by the communication apparatus with a content disclosure range which has been set in the external apparatus, when the server apparatus transfers a content acquired from the communication apparatus to the external apparatus, and
selectively executing notification to the communication apparatus based on the result of the comparison,
wherein in the executing the notification, if the result of the comparison indicates that the content disclosure range set by the communication apparatus is different from the content disclosure range which has been set in the external apparatus, the notification is executed.

14. A server apparatus communicable with a communication apparatus which sends a content to the server apparatus and an external apparatus which distributes a content transferred from the server apparatus to a third-party terminal via a network, comprising:
a memory; and
a processor configured to execute, in accordance with program codes stored in the memory,
receiving a content from the communication apparatus,
transferring the content to the external apparatus,
acquiring a content disclosure range which has been set in the external apparatus from the external apparatus,
transmitting a notification to the communication apparatus if the content disclosure range which has been set in the external apparatus is different from a content disclosure range which has been set in the server apparatus, when the server apparatus transfers a content acquired from the communication apparatus to the external apparatus;
transmitting a setting screen, based on the content disclosure range settable by the server apparatus, for setting a content disclosure range in the server apparatus to the communication apparatus,
storing a content disclosure range input according to the setting screen, and
transferring the content disclosure range input according to the setting screen to the external apparatus.

15. A non-transitory computer-readable storage medium storing a program for causing a computer to execute a control method for an server apparatus communicable with a communication apparatus which sends a content to the server apparatus and an external apparatus, which distributes a content transferred from the server apparatus to a third-party terminal via a network, the method comprising:
receiving a content from the communication apparatus;
transferring the content to the external apparatus;
acquiring a content disclosure range set by the communication apparatus;
acquiring a content disclosure range which has been set in the external apparatus from the external apparatus;
comparing the content disclosure range set by the communication apparatus with the content disclosure range which has been set in the external apparatus, when the server apparatus transfers a content acquired from the communication apparatus to the external apparatus; and selectively executing notification to the communication apparatus based on a result of the comparison, wherein in the executing the notification, if the result of the comparison indicates that the content disclosure range set by the communication apparatus is different from the content disclosure range which has been set in the external apparatus, the notification is executed.

16. A non-transitory computer-readable storage medium storing a program for causing a computer to execute a control method for server apparatus communicable with a communication apparatus and an external apparatus which distributes a content transferred from the server apparatus to a third-party terminal via a network, comprising:

receiving a content from the communication apparatus;

transferring the content to the external apparatus;

acquiring a content disclosure range set by the communication apparatus;

transmitting the content disclosure range set by the communication apparatus to the external apparatus;

receiving a result of comparing the content disclosure range set by the communication apparatus with a content disclosure range which has been set in the external apparatus, when the server apparatus transfers a content acquired from the communication apparatus to the external apparatus; and selectively executing notification to the communication apparatus based on the result of the comparison, wherein in the executing the notification, if the result of the comparison indicates that the content disclosure range set by the communication apparatus is different from the content disclosure range which has been set in the external apparatus, the notification is executed.

17. A non-transitory computer-readable storage medium storing a program for causing a computer to execute a control method for a server apparatus communicable with a communication apparatus which sends a content to the server apparatus and an external apparatus, which distributes a content transferred from the server apparatus to a third party terminal via a network, comprising:

receiving a content from the communication apparatus;

transferring the content to the external apparatus;

acquiring a content disclosure range which has been set in the external apparatus from the external apparatus;

transmitting a notification to the communication apparatus if the content disclosure range which has been set in the external apparatus is different from a content disclosure range which has been set in the server apparatus, when the server apparatus transfers a content acquired from the communication apparatus to the external apparatus;

transmitting a setting screen, based on the content disclosure range settable by the server apparatus, for setting a content disclosure range in the server apparatus to the communication apparatus;

storing a content disclosure range input according to the setting screen; and transferring the content disclosure range input according to the setting screen to the external apparatus.

* * * * *